United States Patent
Regan et al.

(10) Patent No.: US 10,052,800 B2
(45) Date of Patent: *Aug. 21, 2018

(54) AUTOMATED FORMING OF CAST POLYURETHANE

(71) Applicant: NIKE, Inc., Beaverton, OR (US)

(72) Inventors: Patrick Conall Regan, Taichung (TW); Mike F. Quigley, Taichung (TW); Feng-Ming Ou, Taichung (TW); Yu-Hsi Hsing, Taichung (TW)

(73) Assignee: Nike, Inc., Beaverton, OR (US)

( * ) Notice: Subject to any disclaimer, the term of this patent is extended or adjusted under 35 U.S.C. 154(b) by 98 days.

This patent is subject to a terminal disclaimer.

(21) Appl. No.: 15/181,011

(22) Filed: Jun. 13, 2016

(65) Prior Publication Data

US 2016/0279837 A1    Sep. 29, 2016

Related U.S. Application Data

(63) Continuation of application No. 13/833,543, filed on Mar. 15, 2013, now Pat. No. 9,370,880.

(51) Int. Cl.
*B29C 39/06* (2006.01)
*B29C 39/00* (2006.01)
(Continued)

(52) U.S. Cl.
CPC .......... *B29C 39/06* (2013.01); *B29C 39/003* (2013.01); *B29C 39/006* (2013.01); *B29C 39/22* (2013.01);
(Continued)

(58) Field of Classification Search
None
See application file for complete search history.

(56) References Cited

U.S. PATENT DOCUMENTS 3,053,221 A    9/1962 Heffley et al.
4,082,491 A    4/1978 Clymer
(Continued)

FOREIGN PATENT DOCUMENTS

GB    1465155 A    2/1977
GB    2206837 A    1/1989
GB    2469576 A    10/2010

OTHER PUBLICATIONS

European Search Report dated Oct. 7, 2016 in European Patent Application No. 14767807.2, 10 Pages.
(Continued)

*Primary Examiner* — Jacob T Minskey
(74) *Attorney, Agent, or Firm* — Shook, Hardy & Bacon, LLP

(57) ABSTRACT

Cast polyurethane parts for shoes or other items may be formed in an automated fashion. A dispensing mechanism may dispense a predetermined amount of a liquid phase polyurethane mixture onto a flat surface face of a mold. A dispersal mechanism may distribute the liquid phase polyurethane mixture over the flat surface face of the mold to fill at least one cavity in the form. A vacuum may be applied to remove air bubbles from the liquid phase polyurethane mixture. Excess liquid phase polyurethane mixture may be removed from the flat surface face of the mold using a flexible blade that contacts and moves across the flat surface face. One or more conveyance mechanism may transport molds through the desired stages of a system and/or method in accordance with the present invention.

15 Claims, 11 Drawing Sheets

(51) Int. Cl.
*B29C 39/42* (2006.01)
*B29C 41/12* (2006.01)
*B29C 39/24* (2006.01)
*B29C 39/22* (2006.01)
*B29K 75/00* (2006.01)
*B29L 31/50* (2006.01)

(52) U.S. Cl.
CPC .............. *B29C 39/24* (2013.01); *B29C 39/42* (2013.01); *B29C 41/12* (2013.01); *B29C 2791/006* (2013.01); *B29K 2075/00* (2013.01); *B29L 2031/50* (2013.01)

(56) References Cited

U.S. PATENT DOCUMENTS

| | | | |
|---|---|---|---|
| 4,215,730 | A | 8/1980 | Oswald |
| 5,720,324 | A | 2/1998 | Vinciarelli et al. |
| 5,989,480 | A | 11/1999 | Yamazaki |
| 6,726,791 | B1 | 4/2004 | Oelund et al. |
| 7,060,213 | B2 | 6/2006 | Pearce |
| 7,377,596 | B2 | 5/2008 | Steinke et al. |
| 7,955,461 | B2 | 6/2011 | Mase et al. |
| 9,370,880 | B2 * | 6/2016 | Regan .................. B29C 39/006 |
| 2002/0056929 | A1 | 5/2002 | Matsumoto |
| 2003/0096899 | A1 | 5/2003 | Pearce |
| 2010/0065189 | A1 | 3/2010 | Mase et al. |
| 2011/0109010 | A1 | 5/2011 | Mydlack et al. |
| 2012/0101174 | A1 | 4/2012 | Mittag et al. |

OTHER PUBLICATIONS

Decision to Grant dated Nov. 23, 2017 in European Patent Application No. 14767807.2, 1 page.

* cited by examiner

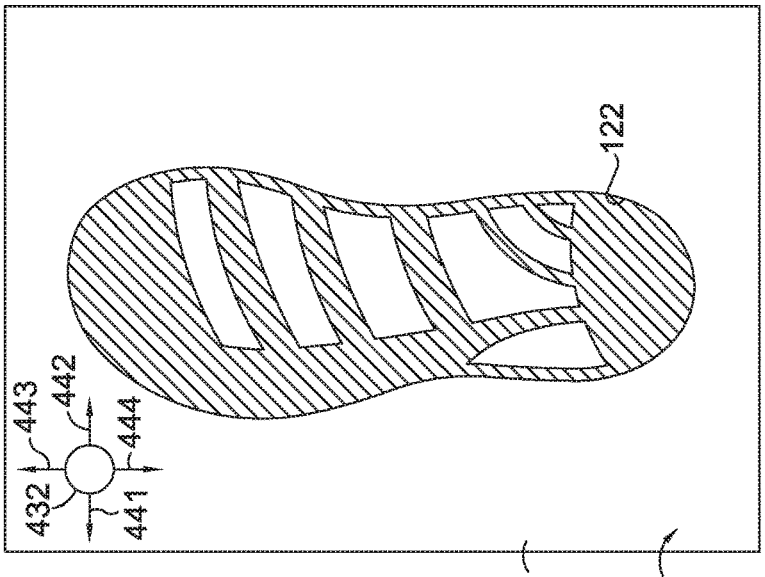
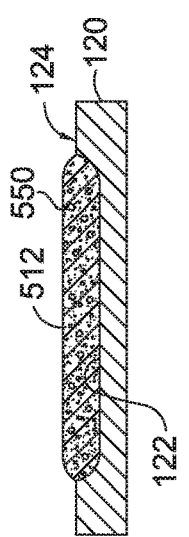
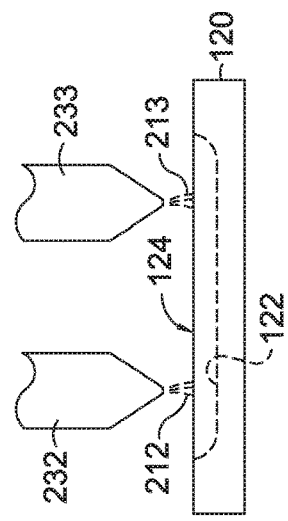
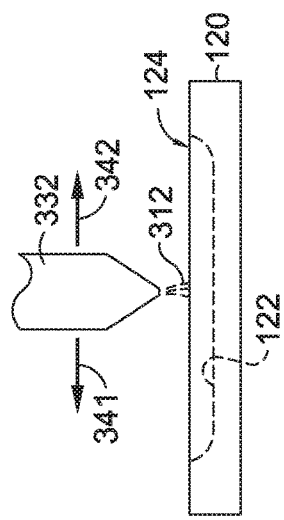
FIG. 2.
FIG. 3.
FIG. 4.
FIG. 5.

AUTOMATED FORMING OF CAST POLYURETHANE

CROSS-REFERENCE TO RELATED APPLICATIONS

This application is a continuation of, and claims priority to, pending U.S. Nonprovisional application Ser. No. 13/833,543, filed Mar. 15, 2013, titled "Automated Forming of Cast Polyurethane," having, the entire contents of which are hereby incorporated by reference.

FIELD

The present invention relates to materials, systems, and/or methods for forming cast polyurethane. More particularly, the present invention relates to the automated production of cast polyurethane parts for use in shoes and other items.

BACKGROUND

Cast polyurethane is a useful component of many products, such as shoes. Cast polyurethane possesses properties, such as being relatively pliable and light weight, that make useful for constructing various items and/or component parts of items. The ability to form polyurethane into a desired shape, size, and configuration desired is particularly useful. However, the known processes for forming cast polyurethane are undesirably inefficient and wasteful. For example, in conventional cast polyurethane forming methods workers using straight edges, squeegees, or the like must repeatedly scrape the liquid phase polyurethane to distribute the polyurethane within a mold cavity and remove excess polyurethane from the face of the mold. The excess polyurethane removed by manual scraping is typically unable to be reused, leading to undesirable waste. In addition to repeated and labor intensive manual scraping steps that waste liquid polyurethane, the liquid polyurethane must be repeatedly subjected to a vacuum force to draw air bubbles out of the liquid. Typically, a scraping step must be performed both before and after each vacuum step, which further increases the labor cost and material waste of forming cast polyurethane. Further, the irregularities of a largely manual process of forming cast polyurethane can lead to irregular product quality, unpredictable product performance, and excessive rejections by quality control evaluation.

SUMMARY

Polyurethane is a useful material utilized in a variety of products such as shoes and, more particularly, athletic shoes. Polyurethane may be used for a variety of purposes in an athletic shoe, such as, but not limited to, soles, midsoles, uppers, structural supports, functional elements on a shoe upper, decorative components, and the like. Polyurethane components in a shoe may be formed using molds to retain a liquid phase polyurethane mixture for curing to create a cast polyurethane part. Cast polyurethane may be referred to as "CPU." Forming cast polyurethane has traditionally been a labor-intensive process. However, manually forming cast polyurethane for shoe parts can lead to irregular and unpredictable characteristics for the resulting parts, as well as requiring additional training and other precautions for the workers involved in forming the cast polyurethane.

Accordingly, systems and methods in accordance with the present invention for the automated forming of cast polyurethane are described herein. Cast polyurethane may be formed using a mold or form with one or more cavities corresponding to the size and shape of the cast polyurethane part to be formed. The mold may have a substantially flat surface face below which the cavity extends. A mold used in accordance with the present invention may move through a system in accordance with the present invention on a conveyance mechanism, such as a sequence of pushers and rollers, a conveyor belt, or any other conveyance mechanism at a predetermined rate or rates. The mold may pause and/or be retained in place at various stations in order for operations to be performed on the polyurethane and/or the mold. A mold may be retained in place using stops, blocks, rails, clamps, or other mechanisms that retain a mold in place while operations are performed on the mold and/or polyurethane on or within the mold. The rate at which an individual mold progresses through a system may vary based upon the portion of the system that the mold is encountering, quality control demands, performance requirements, and the like. A mixing station may combine the component materials of liquid polyurethane, an isocyanate and a polyol, as part of or immediately prior to a liquid phase polyurethane mixture dispensing system. A liquid phase polyurethane mixture dispensing system may dispense liquid polyurethane into the cavity and/or onto the substantially flat surface face of a mold in accordance with the present invention. Various approaches may be used to attain a desired distribution and amount of polyurethane over the face of a mold, such as by using nozzles having a desired distribution pattern that moves dispensers relative to the face of a mold to dispense polyurethane over the face in a desired pattern. For example, a dispensing nozzle may distribute liquid polyurethane in a predetermined amount, at a predetermined rate, and/or in a predetermined pattern so as to fill the cavity of the mold substantially completely with little or no excess liquid polyurethane beyond the amount needed to fill the cavity. By controlling the amount of liquid phase polyurethane mixture dispensed and/or the pattern in which the liquid phase polyurethane mixture is dispensed over the flat surface face of the mold to correspond to the at least one cavity in the mold, the waste of polyurethane may be reduced and the quality of cast polyurethane parts produced may be improved as compared to prior polyurethane processes.

A system in accordance with the present invention may further disperse polyurethane over the face of a mold, for example by using moving air to spread the liquid phase polyurethane mixture across the face of the mold after the liquid phase polyurethane mixture has been deposited. Moving air may be applied by a blower, an air knife, a compressed air source, or other mechanism. Air may be applied at a predetermined angle or angles that serves to move or spread polyurethane in a desired direction(s) within a cavity and/or on the flat surface face of the mold. Additionally/alternatively, a vibration unit such as a shake table may be used to disperse liquid phase polyurethane mixture within a cavity and/or on the flat surface face of the mold. A vacuum system may apply a vacuum to the flat surface face of the mold and the liquid phase polyurethane mixture to extract air bubbles from the liquid phase polyurethane. The vacuum system may interface with the mold to establish a substantially air tight seal, thereby permitting an extremely low pressure to be applied to the liquid polyurethane extracting air bubbles from the liquid polyurethane in a single application rather than multiple applications.

A system in accordance with the present invention may further provide a flexible blade, such as a squeegee, to force the liquid phase polyurethane mixture into the cavity of the mold and/or to remove excess liquid polyurethane from the face of the mold. The mold may be retained in place while the flexible blade contacts and moves across the flat surface face of the mold. Alternatively, the flexible blade may be positioned such that a conveyance mechanism moves the mold beneath the flexible blade such that the flat surface face of the mold contacts at least the edge of the blade as the mold is moved to cause the flexible blade to cross the flat surface face. Various manners of biasing mechanisms, such as springs, pneumatic cylinders, and the like, may be used to bias the flexible blade and/or the mold and/or conveyance mechanisms towards one another to adequately engage the flexible blade against the flat surface face of the mold. A flexible blade may engage the face of a mold at a predetermined angle or angles that is the same as, different from, or related to the angle or angles at which moving air is applied. A flexible blade may, for example, be applied at an angle or in a direction opposing the direction of application of the moving air, which may aid in the uniform distribution of liquid polyurethane in a mold. A cleaning unit may clean residual liquid polyurethane from the flexible blade at appropriate intervals, such as after each use, every five uses, every ten minutes, etc.

In various implementations of systems and methods in accordance with the present invention, these various components may be ordered in different ways, duplicated, or omitted. Further, heating or other curing devices may be used to facilitate the formation of solid polyurethane from the liquid phase polyurethane mixture used in accordance with the present invention. For example, an oven, heating mat, heating table, heat press, or other type of heating device may be used to heat a mold to facilitate partial or complete curing of the liquid phase polyurethane mixture in the cavity of the mold.

Systems and/or methods in accordance with the present invention may pre-clean molds prior to use (by scrubbing or air blowing, for example), treat molds with release agents or the like, inspect molds prior to use, etc. Further, in systems and methods in accordance with the present invention equipment may be provided to remove a cured polyurethane piece from a mold and to clean a form for re-use, if desired.

Methods in accordance with the present invention may convey molds having at least one cavity extending below a flat surface face of the mold through a series of stations or components of a system to form cast polyurethane molds conveyed may be moved so as to maintain the flat surface face in a substantially horizontal orientation. A predetermined amount of a liquid phase polyurethane mixture may be dispensed in a predetermined pattern onto the flat surface face of the mold and/or into the at least one cavity of the mold. The predetermined amount of liquid polyurethane mixture dispensed may correspond to the volume of at least one cavity, and the predetermined pattern in which the liquid phase polyurethane mixture is dispensed may correspond to the configuration and location of the at least one cavity of the mold. The dispensed liquid phase polyurethane mixture may be dispersed, for example using moving air, to facilitate filling of the at least one cavity of the mold. A vacuum may be applied to the liquid phase polyurethane mixture to extract bubbles from the liquid phase polyurethane mixture. Excess liquid phase polyurethane mixture may be removed from the flat surface face of the mold using a flexible blade that contacts and moves across the flat surface face of the mold. The flexible blade may be periodically cleaned to remove liquid phase polyurethane mixture. Additional steps, such as mold preparation, polyurethane curing, de-molding cast polyurethane parts, and the like may also be incorporated in such a method.

DRAWINGS

The drawings described herein are for illustrative purposes only of selected embodiments and not all possible implementations, and are not intended to limit the scope of the present disclosure.

FIG. 2 illustrates one example of a dispensing system in accordance with the present invention.

FIG. 3 illustrates a further example of a dispensing system in accordance with the present invention.

FIG. 4 schematically illustrates an example of a dispensing nozzle dispensing liquid polyurethane mixture onto a mold in accordance with the present invention.

FIG. 5 illustrates an example of a mold after the dispensing of a polyurethane mixture in accordance with the present invention.

Figure 6:
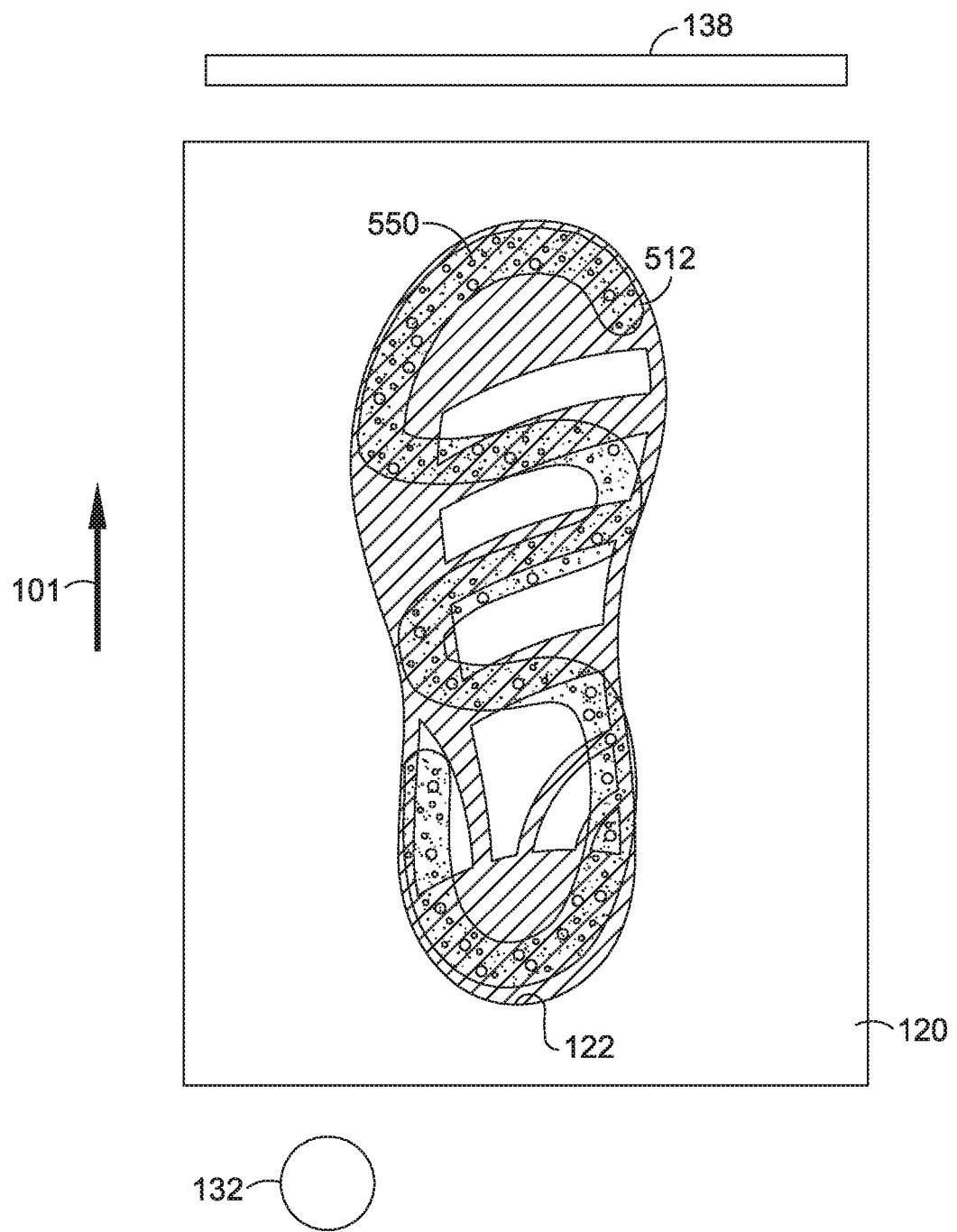

FIG. 6 illustrates an example of a mold after dispensing of a polyurethane mixture but before the dispersal of polyurethane across the flat surface face of the mold.

Figure 7:
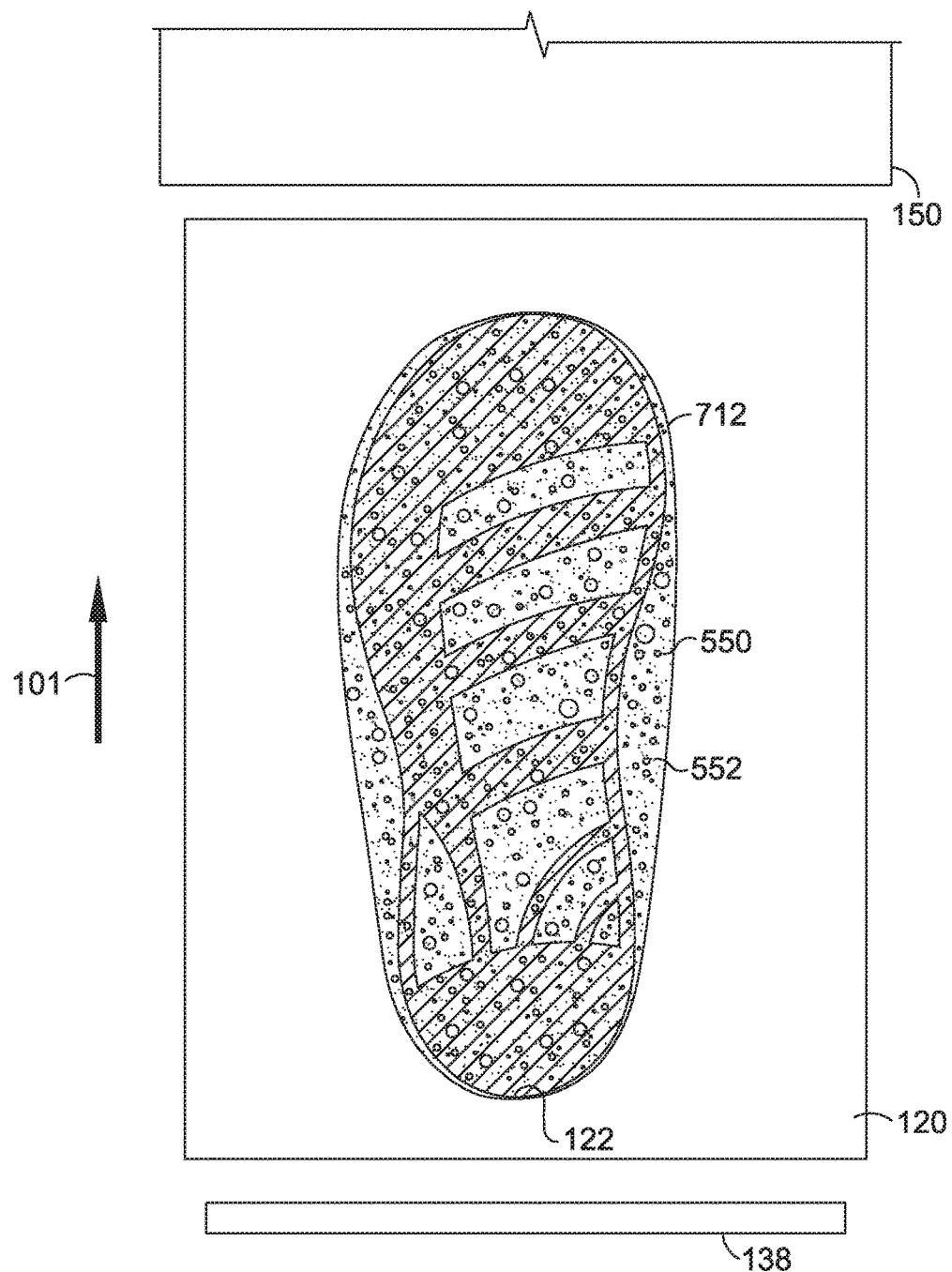

FIG. 7 illustrates an example of polyurethane mixture dispersed across a mold in accordance with the present invention.

Figure 8:
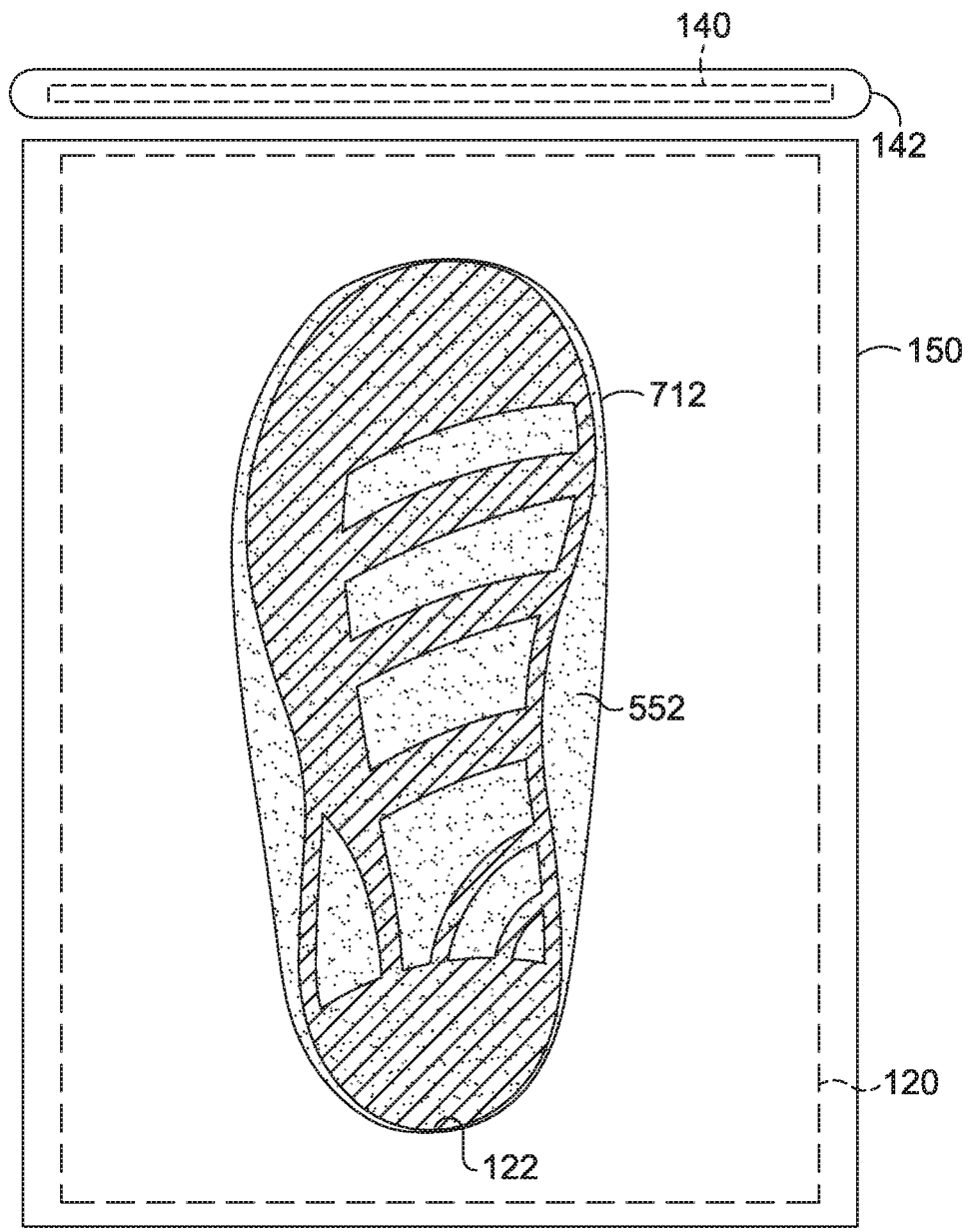

FIG. 8 illustrates an example of a mold with polyurethane mixture in accordance with the present invention while a vacuum is applied to remove bubbles.

Figure 9:
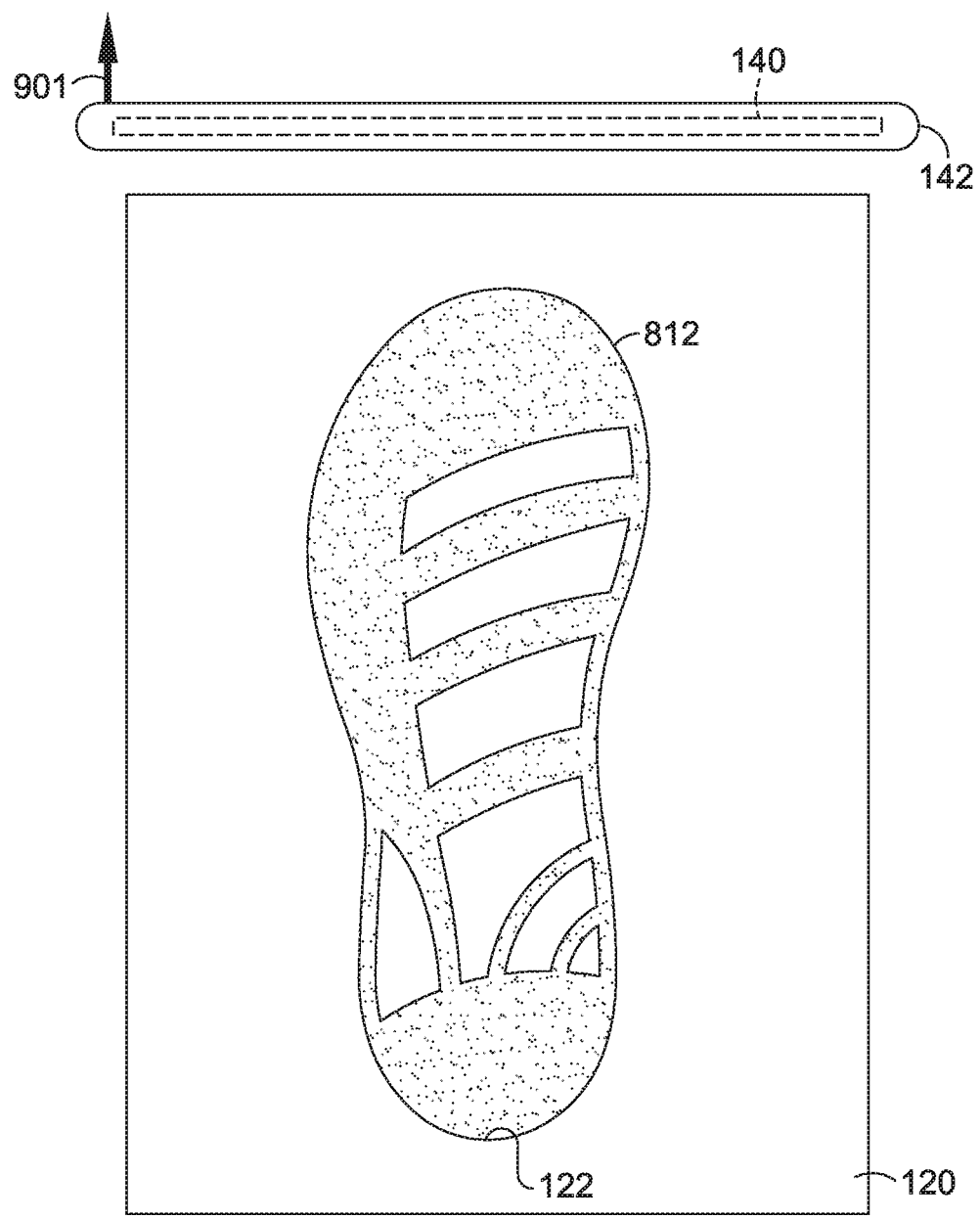

FIG. 9 illustrates an example of a mold in accordance with the present invention after polyurethane mixture has been deposited on its face, dispersed across the face, experienced a vacuum, and the excess polyurethane mixture has been removed.

Figure 10:
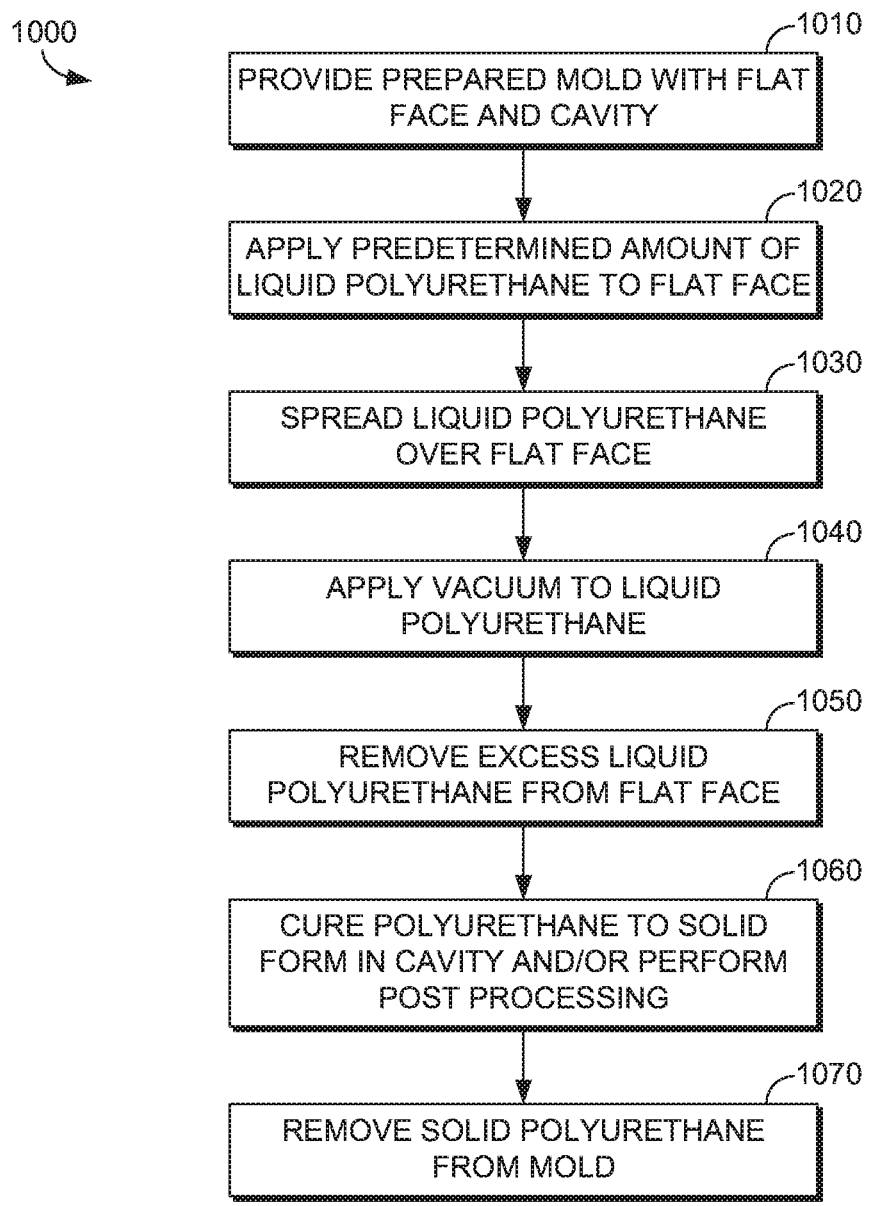

FIG. 10 illustrates an example of a method in accordance with the present invention for forming cast polyurethane.

Figure 11:
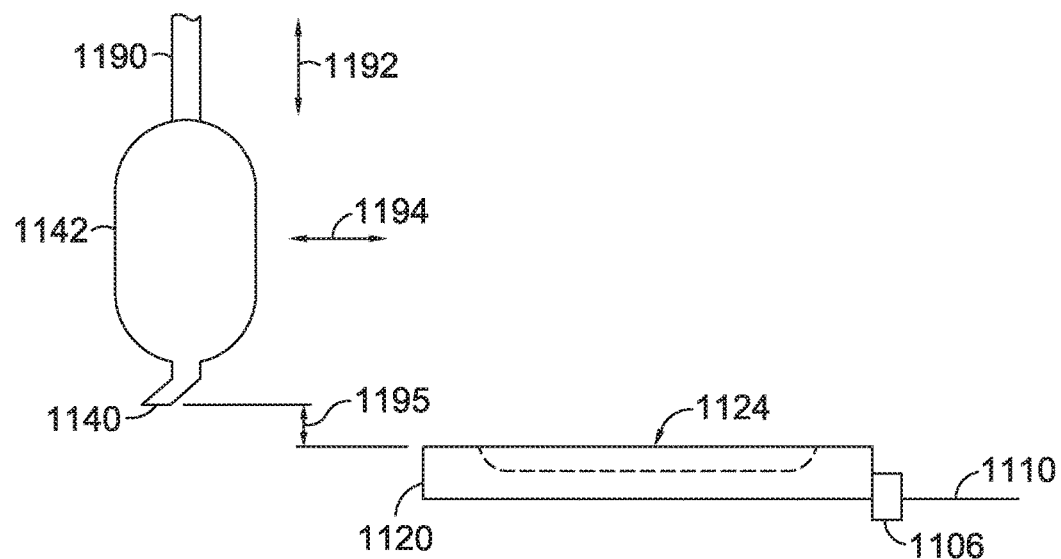

FIG. 11 illustrates an example of a biased flexible blade that may be used in conjunction with forming cast polyurethane in accordance with the present invention.

Figure 12:
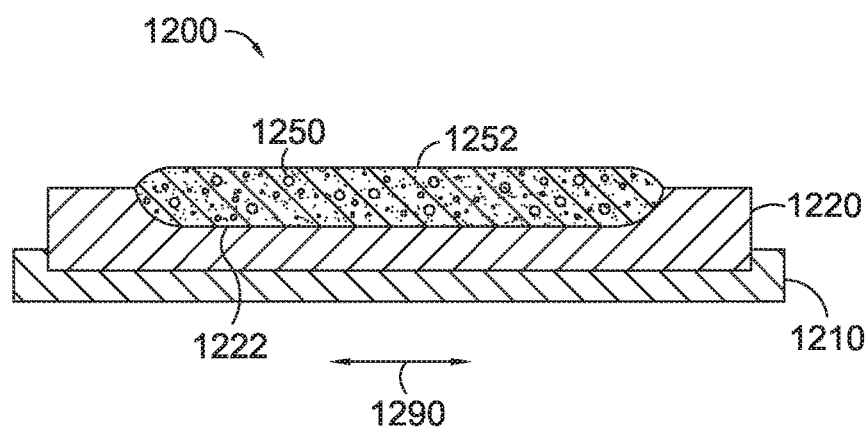

FIG. 12 illustrates an example of a vibrational system that may be used to disperse a liquid polyurethane mixture in accordance with the present invention.

Figure 13:
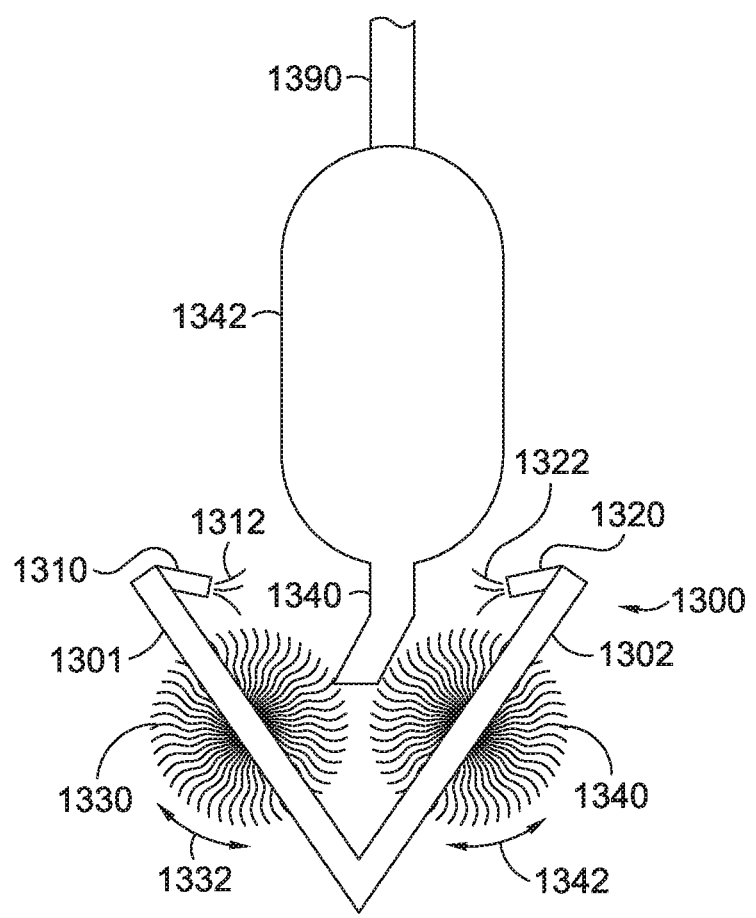

FIG. 13 illustrates an example of a blade cleaning apparatus that may be used to clean a flexible blade used in forming cast polyurethane in accordance with the present invention.

Figure 14:
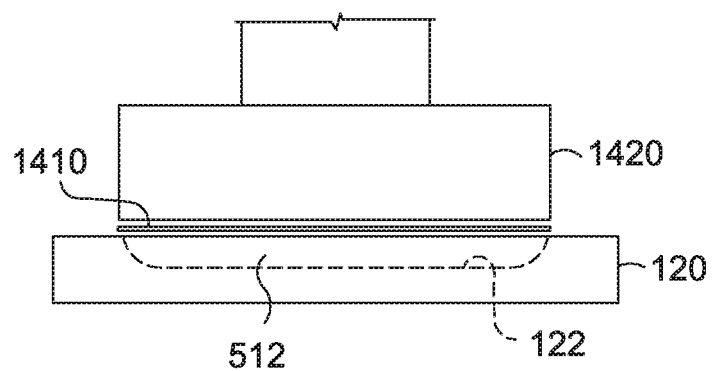

FIG. 14 illustrates an example of adhering a sheet of material to cast polyurethane formed in accordance with the present invention.

Figure 15:
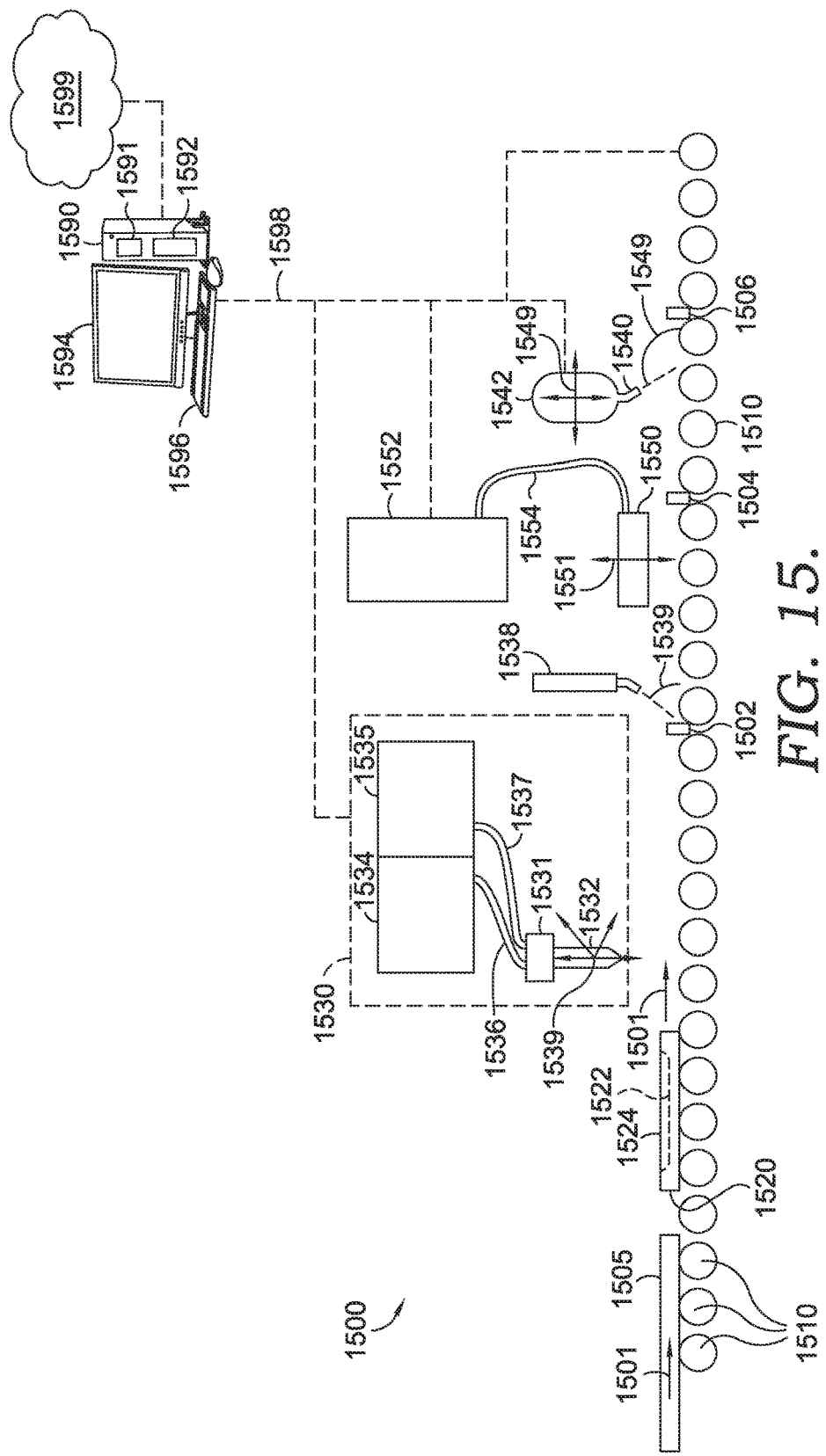

FIG. 15 illustrates a schematic diagram of another exemplary system in accordance with the present invention.

DETAILED DESCRIPTION

The present invention provides systems and methods for forming cast polyurethane. While the present invention is described herein for examples of forming cast polyurethane for use as parts in constructing athletic shoes, the systems and methods in accordance with the present invention may be used for forming cast polyurethane parts for use in other types of shoes or even for products other than shoes. The particular formulation, type, physical properties, chemical properties, etc. of polyurethane desired may vary based upon the properties desired for the product ultimately incorporating the polyurethane part and the purpose of the cast polyurethane part in the finished product. Different types of polyurethane parts may benefit from different types of mold materials, dispensing mechanisms, dispersing mechanisms, curing techniques, and the like. These variations are within the scope of the present invention, although only particular examples are described herein.

Figure 1:
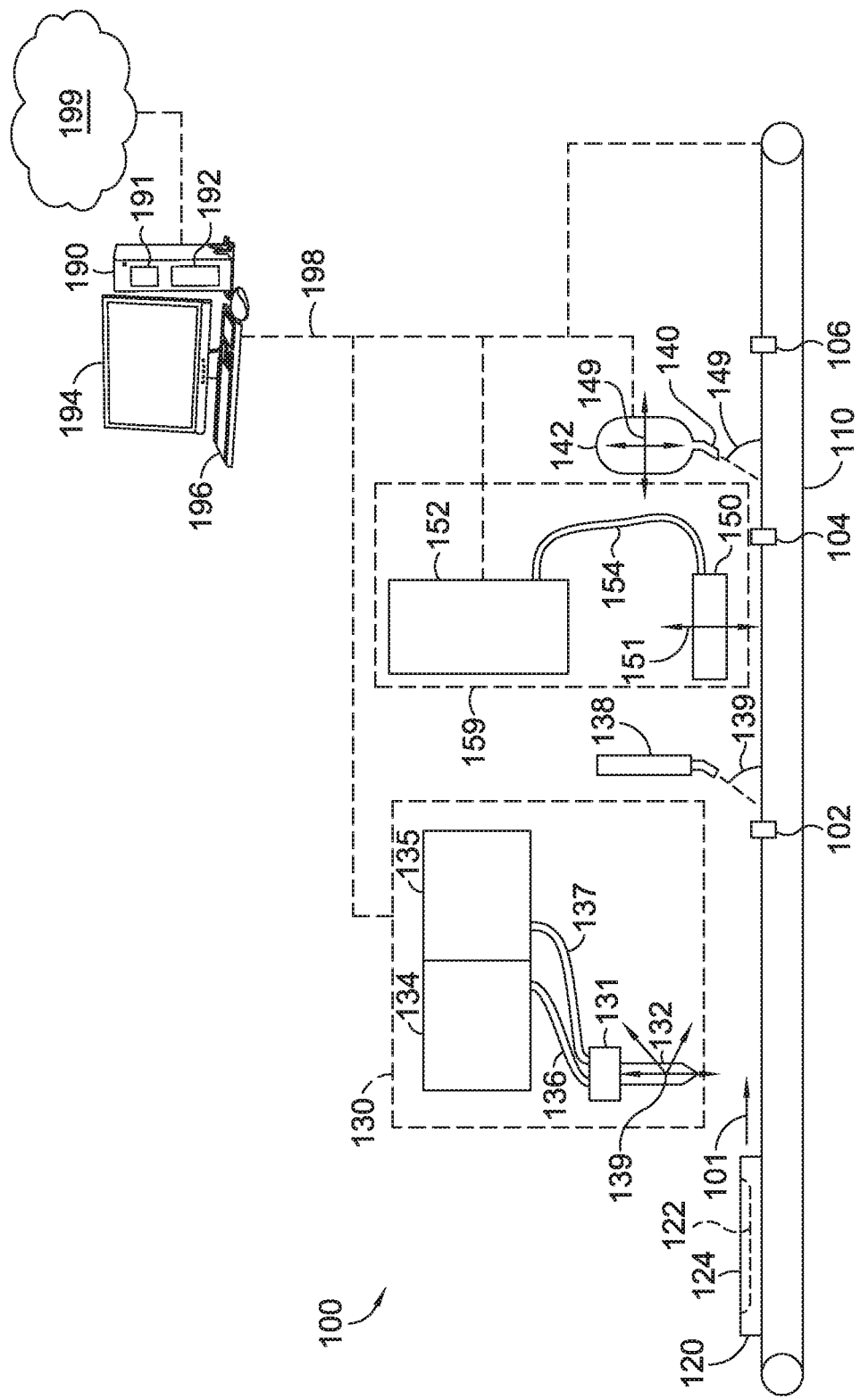
FIG. 1 illustrates a schematic diagram of an example system in accordance with the present invention.

Referring now to FIG. 1, a system 100 for forming cast polyurethane is schematically illustrated. FIG. 1 does not depict example system 100 to scale. System 100 is merely one general example of various components that may be used for forming cast polyurethane in accordance with the present invention. Other configurations, combinations, arrangements, additions, modifications, and/or omissions of the example components illustrated in FIG. 1 may be made. While FIG. 1 illustrates a linear system 100, in any implementations other configurations may be desirable. For example, a system for forming cast polyurethane in accordance with the present invention may effectively form a loop that moves molds repeatedly through a process of forming cast polyurethane parts and then prepares the molds for re-use. Systems in accordance with the present invention may also vary from the example system 100 shown in FIG. 1 in that components may be added, omitted, or modified beyond the examples illustrated in system 100. In some examples of systems in accordance with the present invention, components may operate independently from one another. Further, a system in accordance with the present invention may provide various paths for forming a cast polyurethane part, with a part in processing moving to the next component most available (for example, with the shortest queue of parts awaiting processing) rather than simply proceeding in a substantially linear fashion as described in the examples herein.

As depicted in FIG. 1, a mold 120 may be moved along a conveyance mechanism 110 to permit system 100 to form a cast polyurethane part. Mold 120 may be constructed of aluminum or any other material with the resiliency, durability, thermodynamic properties, etc., required for the forming of a particular type of cast polyurethane. Mold 120 may, if desired, be preheated or prechilled to a desired temperature for optimal cast polyurethane forming conditions. FIG. 1 does not depict any type of form preparation component, but such components may be a part of a system in accordance with the present invention. Mold 120 may have at least one cavity 122 extending beneath a flat surface face 124. While only a single cavity 122 is illustrated within mold 120 in the example of FIG. 1, additional cavities may be present. Cavity 122 may ultimately correspond to the size and shape of the desired cast polyurethane part. Conveyance mechanism 110 is shown as a conveyor belt in the example of FIG. 1, but may be any type of conveyance mechanism, such as chain drive system, a system of rollers, a pusher system, or any other device that moves mold 120 through system 100 may transport mold 120 as indicated by arrow 101 through system 100. FIG. 15, which is described further below, depicts an example of a system in accordance with the present invention wherein a pusher and roller system is used to convey molds.

While the schematic example of FIG. 1 is illustrated in a substantially linear fashion, a system 100 in accordance with the present invention may be organized in a circle, square, vertically, a non-linear fashion, or in any other configuration with different constituent parts of the system 100 arranged as appropriate for the particular application of the invention. For example, instead of a single conveyance mechanism 110, multiple conveyance mechanisms may be used to transport a mold 120 to various stations of a system in accordance with the present invention, potentially with a mold such as mold 120 spending longer amounts of time in some portions of the system rather than others, such as an extended amount of time in an oven for curing of polyurethane. In FIG. 1 a first stop 102, a second stop 104, and a third stop 106 are illustrated. Stops 102, 104, 106 may comprise any type of mechanism or structure that retains a mold 120 in place for processes to be performed upon the mold and/or polyurethane on/in the mold.

A liquid phase polyurethane mixture dispensing system 130 may apply a predetermined amount of a liquid phase polyurethane mixture into the cavity 122 of a mold 120 and/or onto the flat surface face 124 of mold 120 in a predetermined dispersal pattern when conveyance mechanism 110 moves mold 120 into an appropriate position. As indicated by axes 139, dispensing mechanism may be capable of moving in three dimensions to distribute a liquid phase polyurethane mixture on a form in a desired pattern appropriate for the part to be formed. The amount of liquid phase polyurethane mixture dispensed and/or the pattern in which the liquid phase polyurethane mixture is dispensed may correspond to the size and/or location of cavity 122, in order to facilitate the efficient filling of cavity 122. Conveyance mechanism 110 may pause when mold 120 is appropriately positioned, or a mold may be retained by stopper 102. Alternatively or additionally, a mold 120 may be moved off of conveyance mechanism 110 and into position for dispensing system 130, or dispensing system 130 may dispense a liquid phase polyurethane mixture into the cavity 122 and/or upon the flat surface face 124 of mold 120 as mold 120 is moved by conveyance mechanism 110.

Dispensing component 130 may comprise a nozzle 132 that receives liquid phase polyurethane mixture for dispensing. Due to the chemical properties of polyurethane, a reservoir may comprise multiple compartments that contain different components, typically at least an isocyanate and a polyol, that are mixed as needed for dispensing by, for example, nozzle 132. For example, a first compartment 134 may contain an isocyanate and a second compartment 135 may contain a polyol. A first tube 136 may transport the isocyanate from the first compartment 134, and second tube 137 may transport the polyol from the second compartment 135, although additional compartments and/or tubes may be used for additional components or additives such as color agents, that may be desired. First tube 136 and second tube 137, as well as any additional tubes, may transport components to a mixing unit 131 that mixes the components (for example, by agitation, stirring, etc.) to form a liquid phase polyurethane mixture. The resulting liquid phase polyurethane mixture may have materials present in addition to merely polyurethane, such as desired additives, unreacted isocyanate and/or polyol, and/or impurities. Alternatively, first compartment 134 and second compartment 135 may dispense materials to mixing unit without tubes, or already mixed liquid polyurethane may be provided from a reservoir to a dispensing nozzle 132. As explained more fully below, dispensing station 130 and nozzle 132 may distribute a predetermined amount of liquid phase polyurethane mixture in a dispersal pattern into the cavity 122 and/or over the flat surface face 124 of mold 120. These dispersal patterns may be selected, in part, based upon the size and shape of the cavity 122 to be filled with liquid phase polyurethane mixture by system 100 in order to reduce the waste of polyurethane in the process of forming cast polyurethane. While a single cavity 122 is illustrated within a single mold 120 in FIG. 1, in practice a single mold may provide multiple cavities for use in forming cast polyurethane in accordance with the present invention.

A dispersal mechanism 138 may distribute the dispensed liquid phase polyurethane mixture in an appropriate pattern within the cavity 122 and/or over the flat surface face 124 of mold 120. Dispersal mechanism 138 may comprise, for example, an air blower or an air knife that uses moving air to distribute the dispensed liquid phase polyurethane mixture across the flat surface face 124 of the mold 120. An alternative and/or additional dispersal mechanism 138 may be a vibrational unit, such as a shake table. Dispersal mechanism 138 may be omitted entirely if nozzle 132 or other liquid phase polyurethane mixture dispensing mechanism distributes liquid polyurethane over the flat surface face 124 of mold 120 in a manner that is acceptable to adequately fill the cavity 122 used to form an eventual cast polyurethane part. Dispersal mechanism 138 may be part of the dispensing component 130, but dispersal mechanism 138 may comprise an entirely separate component of system 100. Further, dispersal mechanism 138 may constitute a plurality of similar or different mechanisms, such as multiple air knives and/or vibrational units, that operate to distribute liquid polyurethane across a flat surface face 124 of a mold 120. A dispersal mechanism 138 such as a blower, air knife, or the like may be oriented at a distance from the flat surface face of, for example, between 20 and 40 millimeters, may produce an air speed of between 5 and 20 meters per second, and may be positioned at an angle 139 of between 45 and 90 degrees relative to the flat surface face 124. The angle at which moving air approaches the dispensed liquid phase polyurethane mixture and the flat surface face 124 of a mold 120 may serve to move the liquid phase polyurethane mixture in a predetermined direction and distance within the cavity 122 and/or over the face 124 of a mold 120. Such movement of liquid polyurethane may be accounted for in determining the dispensing pattern used by dispensing component 130 in order to efficiently fill the cavity 122 with the liquid phase polyurethane mixture.

A vacuum system 159 may comprise a vacuum generator 152 that applies a reduced air pressure to the liquid phase polyurethane mixture on a mold 120 via a vacuum chamber 150 to extract air bubbles from the liquid phase polyurethane mixture. While the example schematic of FIG. 1 illustrates the vacuum chamber 150 located after the dispersal mechanism 138 and before flexible blade 140 when a mold 120 is transported by conveyance mechanism 110 in the direction indicated by arrow 101, other configurations and/or orders of components may be used. A hose 154 may connect a vacuum-generating unit 152 to a vacuum chamber 150. Hose 154 may comprise a vacuum hose or duct in many implementations of the present invention. A vacuum chamber 150 may move vertically as indicated by axis 151 to engage a mold 120 with an opening or mouth shaped to mate with mold 120 to provide a reasonably air-tight seal over a mold 120 to facilitate the extraction of air bubbles from the liquid phase polyurethane mixture on mold 120 and/or in cavity 122 of mold 120. Alternatively/additionally, vacuum chamber 150 may form a seal with the surface underlying mold 120, which may comprise a conveyance mechanism 110 such as a conveyor belt, a table that retains a mold 120 at the vacuum station, etc. Vacuum chamber 150 may form a temporary seal with a mold 120 while mold 120 is retained in position by stop 104, and may use seals, gaskets, clamps, etc. to attain a sufficiently air tight seal. Vacuum chamber 150 may be moveable as indicated by axis 151 so as to engage and disengage a mold 120 during the process. The duration of application and the power of the vacuum applied may vary. In one example, a vacuum may be applied for a total of thirty seconds, with a pressure of 10 torr attained in 13.5 seconds.

In the present example illustrated in FIG. 1, as conveyance mechanism 110 moves a mold 120 through system 100, after the liquid phase polyurethane mixture has been distributed over the flat surface face 124 of mold 120 and after bubbles have been removed from the liquid phase polyurethane mixture by the vacuum 150, a flexible blade 140 may be used to remove excess remaining liquid phase polyurethane mixture from the flat surface face 124 of mold 120 and/or to force the liquid phase polyurethane mixture into cavity 122 extending below flat surface face 124 of mold 120. Flexible blade 140 may comprise, for example, a squeegee within a holder 142. Holder 142 may be operable to move in at least two dimensions, as indicated by axes 149, in order to contact flexible blade 140 to flat surface face 124 of mold 120 and to move the flexible blade 140 over flat surface face 124 of mold 120 while mold 120 is retained by stopper 106. Alternatively, holder 142 may maintain the positioning of flexible blade 140 relative to the conveyance mechanism 110 and/or a mold 120 being moved by conveyance mechanism 110 to permit mold 120 to be moved so as to bring flexible blade 140 into contact with and across flat surface face 124 of mold 120. In the example illustrated in FIG. 1, blade 140 engages the flat surface face 124 of mold 120 at an angle 149 less than ninety degrees, but angles of other magnitudes and/or varying magnitudes may be used in accordance with the present invention. Further, multiple flexible blades 140 may be used to provide adequate coverage of the entire flat surface face 124 of a mold 120, or a single flexible blade 140 may be used over different locations in multiple passes to provide adequate removal of excess liquid phase polyurethane mixture from a flat surface face 124. A flexible blade 140 may optionally move the liquid phase polyurethane mixture in the opposite direction that moving air from a dispersal mechanism 138 moved the liquid phase polyurethane mixture to further assure an even distribution of the liquid phase polyurethane mixture within a cavity 122.

One or more biasing mechanisms may bias flexible blade 140 or mold 120 (or conveyance mechanism 110 carrying mold 120) toward one another to engage blade 140 against flat surface face 124 of mold 120. Biasing mechanisms may comprise springs, pneumatic cylinders, etc. Alternatively, a holder 142 may rigidly maintain a flexible blade 140 in a position that adequately engages flat surface face 124 of mold 120 without a need for a biasing mechanism.

In various examples of systems and methods in accordance with the present invention, a cleaning mechanism may be optionally provided to remove remaining liquid phase polyurethane mixture from a flexible blade 140. A variety of cleaning mechanisms or combinations of cleaning mechanisms may be used in accordance with the present invention. For example, a cleaning mechanism may be used that moves to a flexible blade 140 that remains stationary in its position relative to the remainder of system 100 after a mold 120 has been scraped by blade 140. Alternatively, a flexible blade 140 may be moved to be engaged by a cleaning mechanism and then repositioned for the next operation of the flexible blade 140. Flexible blade 140 may be constructed of a variety of materials, such as artificial or natural rubbers, flexible metals, composites, and the like. Depending upon the types of materials used for a flexible blade 140, different types of cleaning mechanisms constructed of different materials may be selected. For example, a cleaning mechanism may utilize one or more brush that engages flexible blade 140. A brush or brushes may optionally rotate to facilitate in removing remaining liquid phase polyurethane mixture from a flexible blade 140. Another example of a cleaning mechanism is a nozzle that applies compressed air at a predetermined force, rate, and/or angle to blow liquid polyurethane from the flexible blade 140. By way of further example, water or other solvents may be sprayed to remove liquid polyurethane from a flexible blade 140, or a flexible blade 140 may be submerged partially or entirely in a bath of water and/or another solvent to remove excess liquid phase polyurethane mixture. Yet another example of a possible cleaning mechanism is a vibrating mechanism that will induce vibrations to a flexible blade 140 to vibrate residual liquid phase polyurethane mixture from the flexible blade 140. Further, multiple types of cleaning mechanisms may be used simultaneously and/or serially to obtain a desired level of cleanliness of a flexible blade 140. In one example, one or more air nozzles may spray air at an angle along the length of blade 140 while one or more rotating circular brushes engage along the length of the blade 140. For example, a flexible blade 140 may be moved to insert into a solvent bath, after which flexible blade 140 may be vibrated and engaged by a water spray. After being engaged by a water spray, a flexible blade 140 may be engaged by rotating brushes to finish the cleaning of the flexible blade. Depending upon the type of flexible blade used, the properties of the liquid phase polyurethane mixture dispensed in accordance with the present invention, and/or the cleanliness tolerances required for a particular application of the present invention, any number of cleaning mechanisms may be used on a flexible blade 140 at any desired regularity. For example, a flexible blade 140 may be cleaned after each use, after every five uses, at hour intervals, or at any other regularity appropriate for a particular use of systems and methods in accordance with the present invention.

Conveyance mechanism 110 may ultimately transport a mold 120 along the direction indicated by arrow 101 to additional components, some of which are described more fully below. For example, additional stations of a system in accordance with the present invention may pre-cure a liquid phase polyurethane mixture, cure the liquid phase polyurethane mixture, apply additional components such as textiles to the polyurethane, remove cast polyurethane from a mold, clean molds, apply mold release agents to molds for future use, prechill or pre-heat molds for future use, quality control or inspection stations for cast polyurethane and/or molds, etc.

A computing device 190 having a processing unit 191 executing instructions from a computer readable media 192 may monitor and/or control the operation of one or more component of system 100 via connections 198. Computing device 190 may have an output device(s) 194 and an input device(s) 196 to permit a human user to evaluate or modify the performance of system 100. Computing device 190 may be connected to a network 199, thereby permitting various components of system 100 and/or computing device 190 itself to be located remotely from other components. Connections 198 and to network 199 may be wireless or wired and may use any protocol to monitor and/or control system 100 or to provide/receive information from a human user. Any type of input device 196 and output device 194 may be used, such as devices that may function both to provide outputs and to receive inputs, such as touchscreens.

Referring now to FIG. 15, a further example of a system 1500 in accordance with the present invention is illustrated. System 1500 in the example of FIG. 15 resembles system 100 in the example of FIG. 1, except that system 1500 uses rollers 1510 and at least one pusher 1505 as a conveyance mechanism instead of the conveyor belt 110 shown in the example of FIG. 1. Other exemplary components depicted in the example of FIG. 15 may resemble the corresponding exemplary components described above with regard to the example of FIG. 1.

Referring now to FIG. 2, a further example of a dispensing mechanism is illustrated. In the example illustrated in FIG. 2, a first nozzle 232 dispenses a first stream 212 of a liquid phase polyurethane mixture while a second nozzle 233 dispenses a second stream of a liquid phase polyurethane mixture 213 over a mold 120 and into cavity 122. The distance between a nozzle 232, 233 and mold 120 may be selected based upon the properties desired for the liquid phase polyurethane mixture distributed in the streams 212, 213, with a shorter distance reducing the number of bubbles formed in the liquid phase polyurethane mixture and reducing the spread of each of the liquid phase polyurethane mixture streams 212, 213 before contacting the mold 120. The example arrangement illustrated in FIG. 2 may, for some examples, attain a satisfactory distribution of liquid phase polyurethane mixture over the flat surface face 124 of mold 120 such that all portions of cavity 122 are engaged, thereby precluding the need to use a dispersal mechanism 138, or reducing the functionality required for such a dispersal mechanism 138.

Referring now to FIG. 3, a further example of a dispensing mechanism in accordance with the present invention is illustrated. In the example shown in FIG. 3, a single nozzle 332 dispenses a stream 312 of liquid phase polyurethane mixture into cavity 122 and/or onto flat surface face 124 of mold 120. As indicated in FIG. 3, nozzle 332 may be actuated in both a first direction 341 and a second direction 342 to facilitate the distribution of the liquid phase polyurethane mixture over a flat surface face 124 of mold 120. As indicated by axes 139 in FIG. 1, however, a nozzle such as nozzle 332 may be movable in all three dimensions, allowing nozzle 332 to widely and precisely distribute a stream of liquid phase polyurethane mixture within cavity 124. If actuated vertically, the distance between nozzle 332 and mold 120 may be varied during distribution of the liquid phase polyurethane mixture, if desired. For some example applications, a nozzle 332 that may be actuated in multiple directions may provide adequate distribution of a liquid phase polyurethane mixture over the surface face 124 of mold 120 to adequately engage all portions of cavity 122. If such is the case, a dispersal mechanism 138 may potentially be omitted or may be reduced in functionality.

Referring now to FIG. 4, a further example of a nozzle 432 is shown schematically above a form 120 with a cavity 122. In the example shown in FIG. 4, nozzle 432 may move along two axis, such that nozzle 432 may move in a first direction 441 and in an opposing second direction 442 along a first axis, and nozzle 432 may further move in a third direction 443 and in an opposing fourth direction 444 along a second axis. Optionally, nozzle 432 may move along another axis, in this example closer or further to mold 120, or may move to tilt at an angle relative to mold 120. Such mobility of nozzle 432 may permit the dispensing of a liquid phase polyurethane mixture over a surface face 124 and/or into a cavity 122 of a mold 120 in an efficient pattern. Further, by precisely controlling the amount of polyurethane mixture dispensed by nozzle 432, whether by weight, or by volume, or both, waste of polyurethane may be reduced without impairing the quality of the resulting cast polyurethane parts due to the precise placement of the liquid phase polyurethane mixture within the cavity 122 of a mold 120.

Referring now to FIG. 5, an example mold 120 with liquid phase polyurethane mixture 512 dispensed over at least a portion of the flat surface face 124 and into at least a portion of cavity 122 is illustrated. The example illustrated in FIG. 5 may be attained in any of a number of fashions, such as, but not limited to, the examples illustrated in FIGS. 2-4 above. As can be seen from the example illustrated in FIG. 5, liquid phase polyurethane mixture 512 extends beyond the flat surface face 124 of mold 120, rather than being limited merely to cavity 122 corresponding to the part to be formed from polyurethane. As described herein, further components in accordance with the present invention may function to distribute liquid phase polyurethane mixture throughout the cavity 122 of mold 120 and remove any excess liquid phase polyurethane mixture from the flat surface face 124 of the mold 120. The amount of liquid phase polyurethane mixture dispensed into cavity 122 may be selected so as to minimize the amount of polyurethane used beyond the minimum necessary to fill cavity 124 while also providing a sufficient amount to assure that the cavity 122 is fully filled. The precise positioning of liquid phase polyurethane mixture during the dispensing may enable less waste of polyurethane while still attaining a complete filling of a cavity 124 with liquid phase polyurethane mixture. The actual amount of liquid phase polyurethane mixture dispensed relative to the size of a cavity 122 may vary from that illustrated in FIG. 5, which is for illustrative purposes only. As also illustrated in FIG. 5, a plurality of bubbles 550 may be introduced into the liquid phase polyurethane mixture before or during the dispensing process. Such bubbles 550 may undermine the consistency and structural qualities of the finished cast polyurethane product and, therefore, may be removed prior to curing the polyurethane as described herein.

Referring now to FIG. 6, a mold 120 having therein a cavity 122 is illustrated. Mold 120 and cavity 122 are merely examples. The cavity 122 illustrated in FIG. 6 may correspond to any type of part desired for a shoe or other item. The example shown in FIG. 6 is exemplary only, with actual molds 120 and actual cavities 122 used in accordance with the present invention being able to take any of a variety of forms, depending upon the item to be ultimately manufactured and the desired size, shape, properties, etc. of the ultimately formed cast polyurethane part. As indicated by arrow 101, mold 120 may be moving as indicated through a system such as system 100. As shown in the example of FIG. 6, a single dispensing nozzle 132 has applied a predetermined amount of a liquid phase polyurethane mixture 512 in a predetermined pattern over the flat surface face 124 of mold 120. Both the amount and pattern used to dispense the liquid phase polyurethane mixture 512 corresponds to the size and configuration of cavity 122. Any of a variety of dispensing mechanisms, such as but not limited to those described with regard to FIGS. 2-4 may be used in accordance with the present invention. As can be seen in the example of FIG. 6, a predetermined amount of liquid phase polyurethane mixture 512 has been dispensed in a pattern that places most of the dispensed liquid polyurethane within cavity 122. As also shown in FIG. 6, dispensed liquid phase polyurethane mixture 512 may have a large number of bubbles 550. As shown in FIG. 6, the direction of movement 101 by conveyance mechanism 110 has not yet brought mold 120 to the dispersal mechanism 138.

Referring now to FIG. 7, a mold 120 with a cavity 122 therein is illustrated after a dispersal mechanism 138 has distributed the liquid phase polyurethane mixture 712 over the flat surface face 124 of mold 120. As can be seen from comparing the dispensed liquid phase polyurethane mixture 512 in FIG. 6 to the dispersed liquid phase polyurethane mixture 712 in FIG. 7, dispersal mechanism 138 has distributed the liquid phase polyurethane mixture across the flat surface face 124 of mold 120 such that the entirety of cavity 122 is covered without a large amount of the liquid phase polyurethane mixture needlessly distributed over the flat surface face 124 of mold 120. As described above, dispersal mechanism 138 may comprise a blower, air knife, vibration unit, or other types of mechanisms that distributes liquid phase polyurethane mixture over the flat surface face 124. As can be further seen in the example illustrated in FIG. 7, the liquid phase polyurethane mixture has been moved from the pattern in which it was dispensed (for example as illustrated in FIG. 6) to distribute the liquid phase polyurethane mixture within cavity 122. As also shown in the example of FIG. 7, at least some of the distributed liquid phase polyurethane mixture 712 extends beyond the cavity 122 and onto the flat surface face 124 of the mold 120.

Referring now to FIG. 8, a vacuum chamber 150 has engaged a mold 120 and/or a surface beneath a mold 120 with a liquid phase polyurethane mixture 712 filled cavity to generate a vacuum over the flat surface face 124 of mold 120. The reduced air pressure of the applied vacuum results in bubbles 550 illustrated in prior figures being extracted from the liquid phase polyurethane mixture 712 in the cavity 122 of mold 120. The configuration illustrated in FIG. 8 for applying a vacuum to a mold 120 may occur at different stages of the process and at different positions relative to the other components described herein, but in the present example occurs after the application of a dispersal mechanism 138 and before application of a flexible blade 140.

Referring now to FIG. 9, a flexible blade 140 retained in a holder 142 has removed excess liquid phase polyurethane mixture from the flat surface face 124 of mold 120 and forced liquid phase polyurethane mixture into cavity 122 such that the only remaining liquid phase polyurethane mixture 812 fills cavity 122. In the present example, a vacuum has already removed bubbles from the liquid phase polyurethane mixture. As indicated by arrow 901, mold 120 has been retained in place while blade 140 has been moved across the face 124 of mold 120 in direction 901, which moves liquid phase polyurethane mixture in the opposite direction (relative to cavity 122) that dispersal mechanism 138 previously moved the liquid phase polyurethane mixture. At this point, flexible blade 140 may be optionally cleaned by a cleaning mechanism to be prepared for its next application on a subsequent mold.

While FIGS. 6-9 illustrate discrete events of application of liquid phase polyurethane mixture to a mold 120, dispersal of liquid phase polyurethane mixture over a mold 120, and the removal of excess liquid phase polyurethane mixture from the flat surface face 124 of a mold 120 and forcing liquid polyurethane into a cavity 122 of mold 120, these need not be totally discrete steps or portions of a system in accordance with the present invention. For example, a dispersal mechanism 138 may be distributing liquid phase polyurethane mixture at one portion of a mold 120 while a nozzle 132 is still applying liquid phase polyurethane mixture to a flat surface face 124 of a mold 120. Further, a flexible blade 140 may be forcing liquid phase polyurethane mixture into a cavity 122 and removing excess liquid phase polyurethane mixture from a flat surface face 124 of a mold 120 while a dispersal mechanism 138 is still dispersing liquid phase polyurethane mixture across a flat surface face 124 of a mold 120 and/or a dispensing mechanism 132 is still applying liquid phase polyurethane mixture to another portion of a flat surface face 124 of a mold 120.

Referring now to FIG. 10, a method 1000 for forming cast polyurethane in accordance with the present invention is illustrated. Method 1000 is merely one example of an acceptable method in accordance with the present invention. Some steps of method 1000 illustrated in the present example may be omitted, while others may be performed in different orders, and further steps may be added without departing from the scope of the present invention. In step 1010, a mold with a flat surface face and a cavity may be prepared for forming cast polyurethane and provided to a dispensing component. The mold provided in step 1010 may comprise a mold made of aluminum or any other type of material. The mold provided in step 1010 may be cleaned and/or treated with a mold release material to facilitate the ultimate removal of a cast polyurethane component. Further, the mold provided in step 1010 may be preheated or cooled, if desired, to provide optimal conditions for forming cast polyurethane from a liquid phase polyurethane mixture.

In step 1020 a liquid phase polyurethane mixture may be applied to the flat surface face of the mold. Any dispensing mechanism, some examples of which are described herein, may be used in step 1020. The amount of liquid phase polyurethane mixture dispensed in step 1020 may be measured, whether by weight or by volume, to provide a sufficient amount of liquid phase polyurethane mixture to fill a cavity on the mold provided in step 1010, and the pattern in which the liquid phase polyurethane mixture is dispensed may correspond to the cavity in the mold.

The liquid phase polyurethane mixture applied to the flat surface face of mold may be distributed in step 1030. Step 1030 may use an air blower, an air knife, vibrational unit, or another dispersal mechanism to spread the liquid phase polyurethane mixture over the flat face of a mold to sufficiently engage a cavity of the mold corresponding to the cast polyurethane part ultimately to be formed by method 1000. Optionally, step 1030 may be eliminated, particularly if prior step 1020 of applying liquid phase polyurethane mixture applies the liquid phase polyurethane mixture with an adequate distribution over the flat surface face of a mold to appropriately and acceptably fill the cavity of the mold provided in step 1010.

A vacuum may be applied to the liquid phase polyurethane mixture on a mold to remove air bubbles from the liquid phase polyurethane mixture in step 1040. Step 1040 may involve creating an appropriately air-tight seal between a vacuum chamber and a mold and/or the surface beneath a mold. The strength of the vacuum applied and the duration of applying the vacuum of step 1040 may vary based upon the quantity and size of bubbles within the liquid phase polyurethane mixture, the quality desired for the cast polyurethane part, the amount of liquid phase polyurethane mixture dispensed onto the mold, and the viscosity of the liquid phase polyurethane mixture dispensed.

In step 1050 excess liquid phase polyurethane mixture may be removed from the face of the mold, which may also ensure that liquid phase polyurethane mixture is forced into all areas of a cavity or cavities on a mold. Step 1050 may be performed using a flexible blade, as described herein. Further, a flexible blade used in performing step 1050 may be cleaned at various intervals, such as after every use, after every second use, every five minutes of use, etc.

The polyurethane mixture may be further processed and/or cured to change it from a liquid phase to a solid phase within the cavity of the mold in step 1060. The curing of step 1060 may involve the passage of time, the heating of a mold and/or the liquid phase polyurethane mixture within a cavity of a form, manipulating the relative humidity around the polyurethane mixture, etc. to obtain the desired physical properties of the polyurethane for use in a part for a shoe or another item. Any optional post processing performed in step 1060 may occur before, during, or after any curing of the polyurethane has occurred. For example, a textile may be joined to a partially cured polyurethane part using a heat press to both enable the cast polyurethane to be subsequently removed from the mold more easily and to facilitate the integration of the resulting cast polyurethane part into a larger item, such as a shoe upper.

The various steps of method 1000 may be performed by different components of a system, while some steps may be combined to be performed in a single step and/or by a single component of a system. A conveyance mechanism may move molds used in practicing method 1000 from one component or station to another for the performance of various steps of the method 1000. More than one conveyance mechanism may be used in such an example, and some steps of method 1000 may not involve a conveyance mechanism transporting a mold to a particular device, apparatus, or station for performing that step. A mechanism may retain a mold in place for a step of method 1000, or a step of method 1000 may be performed while a mold is in motion through a larger system. A computer system executing instructions retained on computer readable media may control various components may carry out methods in accordance with the present invention such as method 1000.

Referring now to FIG. 11, a further example for a flexible blade 1140 and flexible blade holder 1142 is illustrated. As shown in FIG. 11, an arm 1190 may actuate flexible blade 1140 and holder 1142 vertically over a distance 1195 to allow flexible blade 1140 to engage a surface of a mold 1120 by containing and moving across the flat surface face 1127 of mold 1120. As explained previously, blade 1140 when actuated over distance 1195 may engage mold 1120 by mold 1120 being moved towards blade 1140, by blade 1140 being moved towards form 1120, or some combination. In the example illustrated in FIG. 11, actuation communicated by arm 1190 may be accomplished using any type of mechanism or principal. Arm 1190 may further move flexible blade 1140 and holder 1142 horizontally 1194 across the flat surface face 1124 of mold 1120 retained in place by stopper 1106. After blade 1140 has been moved across flat surface face 1124 of mold 1120 to remove any excess liquid polyurethane, stopper 1106 may be withdrawn or released to permit mold 1120 to be moved further by conveyance mechanism 1110.

Referring now to FIG. 12, an example of a vibrational unit 1200 that may be used to disperse a liquid phase polyurethane mixture 1252 within a cavity 1222 of a mold 1220. Vibrational unit 1200 may comprise a base 1210 or other attachment mechanism that engages a mold 1220 and shakes or vibrates mold 1220 as indicated by arrows 1290. Any type of engine, motor, or other driving mechanism may be used by vibrational unit 1200 to impart vibrations to base 1210 and, ultimately, to mold 1220 and liquid phase polyurethane mixture 1252. The vibrations of a vibrational unit 1200 may occur in one, two, or three dimensions. A vibrational unit 1200 may be used in conjunction with another dispersal mechanism or instead of another dispersal mechanism. For example, a vibrational unit 1200 may be used before, during, or after an air knife or air blower disperses the liquid phase polyurethane mixture 1252.

Referring now to FIG. 13, one example of a blade cleaning mechanism 1300 is illustrated. A blade cleaning mechanism 1300 may be used to remove excess liquid phase polyurethane mixture from a flexible blade 1140 after use. Flexible blade 1140 may resemble that illustrated in the example of FIG. 11, but other types of flexible blades may be cleaned by a mechanism 1300 in accordance with the present invention. While various examples of suitable flexible blade cleaning mechanisms have been described above, the example shown in FIG. 13 is provided for illustrative purposes. Blade cleaning mechanism 1300 may be moved relative to the flexible blade 1140 to be cleaned, although the flexible blade 1140 may alternatively/additionally be moved towards the cleaning mechanism 1300. In the example shown in FIG. 13, a first air nozzle 1310 dispenses a stream of arrow 1312 to remove excess liquid phase polyurethane mixture from the flexible blade 1140. In the example of FIG. 13, a second air nozzle 1320 may provide a second stream of arrow 1322 to remove excess liquid phase polyurethane mixture from the opposite side of the flexible blade 1140 from the first air nozzle 1310. After the application of air streams from a first air nozzle 1310 and/or a second air nozzle 1320, a first rotating brush 1330 and/or a second rotating brush 1340 may engage flexible blade 1140 while spinning as indicated by arrow 1332 and arrow 1342 to remove any remaining liquid phase polyurethane mixture from blade 1140 that was not removed by air streams 1312, 1322. The cleaning mechanism 1300 illustrated in FIG. 13 may be actuated towards and away from blade 1140 mechanically, pneumatically, or through any other process. Further, other examples of blade cleaning mechanisms, some of which are described above, may be used in conjunction with the present invention.

Referring now to FIG. 14, the application of a sheet of material 1410 using a press 1420 is illustrated. Sheet 1410 may comprise, for example, a knit or woven textile, a nonwoven textile, a film material, or any other sheet of material that is desired to be affixed to the cast polyurethane 512 within cavity 122 of mold 120. Sheet 1410 may be adhered to polyurethane 512 using an adhesive and/or the flow properties of the polyurethane 512, depending upon the cure status of the polyurethane 512. Press 1420 may comprise a heat press that applies both heat and pressure to facilitate bonding. Affixing sheet 1410 to polyurethane 512 may be useful for later construction of a shoe or other item from the cast polyurethane 512, as well as to facilitate the extraction of the cast polyurethane 512 from the cavity 122 of mold 120. The application of a sheet 1410 using a press 1420 may particularly occur after polyurethane 512 has been partially cured, for example using a heating table 1210 illustrated in FIG. 12.

While a specific example system and method in accordance with the present invention have been described herein, the present invention is not limited to these specific examples. The present invention may be used with any desired formulation of polyurethane and to make any desired part from cast polyurethane. Different materials for forms, flexible blades, and the like may be used, with some materials being better suited to different formulations of polyurethane. Moreover, dispensing mechanisms, dispersal mechanisms, cleaning mechanisms, and the like may vary based upon the particular demands and desires of a specific application of the present invention.

What is claimed is:

1. A system for forming cast polyurethane, the system comprising:
    a mold conveyance mechanism that conveys a mold with at least one cavity through the system during the forming of cast polyurethane, the at least one cavity within the mold extending below a flat surface face of the mold when the mold is maintained in a substantially horizontal orientation during the process of forming cast polyurethane;
    a liquid phase polyurethane mixture dispensing system that deposits a predetermined amount of liquid phase polyurethane mixture onto the flat surface face of the mold in a predetermined pattern corresponding to the at least one cavity within the mold when the conveyance mechanism positions the mold beneath the liquid phase polyurethane mixture dispensing system;
    a vacuum system that applies a vacuum to the liquid phase polyurethane mixture in the at least one cavity within the mold; and
    a flexible blade that contacts and moves across the flat surface face of the mold after the conveyance mechanism has moved the mold to the flexible blade, the flexible blade forcing liquid phase polyurethane into the cavities extending below the flat surface face of the mold and removing excess liquid phase polyurethane mixture from the flat surface face of the mold.

2. The system for forming cast polyurethane of claim 1, wherein the flexible blade contacts and moves across the flat surface face of the mold after the vacuum system applies a vacuum to the liquid phase polyurethane mixture.

3. The system for forming cast polyurethane of claim 1, wherein the flexible blade contacts and moves across the flat surface face of the mold before the vacuum system applies a vacuum to the liquid phase polyurethane mixture.

4. The system for forming cast polyurethane of claim 1, further comprising a cleaning unit that removes liquid phase polyurethane mixture from the flexible blade after the flexible blade has contacted and moved across the flat surface face of the mold.

5. The system for forming cast polyurethane of claim 4, wherein the cleaning unit comprises a liquid jet.

6. The system for forming cast polyurethane of claim 4, wherein the cleaning unit physically contacts and wipes the flexible blade.

7. The system for forming cast polyurethane of claim 4, wherein the cleaning unit comprises a chamber containing liquid in which the flexible blade is immersed.

8. The system for forming cast polyurethane of claim 4, wherein the cleaning unit comprises an ultrasonic vibration unit that vibrates the flexible blade.

9. The system for forming cast polyurethane of claim 1, wherein the mold conveyance mechanism transports comprises a system of rollers that support a mold and at least one pusher that impart force to move the mold along the rollers.

10. The system for forming cast polyurethane of claim 1, wherein the mold conveyance mechanism comprises at least one conveyor belt.

11. A method for forming cast polyurethane, the method comprising:
    conveying a mold through a series of stations such that the mold maintains a flat surface face substantially horizontal and facing upward while being conveyed, the mold having at least one cavity extending below the flat surface face;
    dispensing a predetermined amount of a liquid phase polyurethane mixture onto the flat surface face of the mold in a predetermined configuration corresponding to the at least one cavity after the mold has been conveyed to a dispensing station;
    applying a vacuum to the liquid phase polyurethane mixture after the liquid phase polyurethane mixture has been dispersed onto the flat surface face and into the at least one cavity when the mold is beneath a vacuum system; and removing excess liquid phase polyurethane mixture from the flat surface face of the mold with a flexible blade that contacts and moves across the flat surface face after the vacuum has been applied to the liquid phase polyurethane mixture.

12. The system for forming cast polyurethane of claim 10, wherein the flexible blade is maintained in position while the mold is moved by the conveyor belt to cause the flexible blade to contact and move across the flat surface face of the mold.

13. The method for forming cast polyurethane of claim 11, wherein removing excess liquid phase polyurethane mixture from the flat surface face of the mold comprises retaining the mold in place while moving the flexible blade to bring the flexible blade into contact with the flat surface face and across the flat surface face.

14. The method for forming cast polyurethane of claim 11, further comprising cleaning the flexible blade after removing the excess liquid phase polyurethane from the flat surface face of the mold.

15. The method for forming cast polyurethane of claim 13, wherein removing excess liquid phase polyurethane from the flat surface face of the mold comprises retaining the flexible blade in place while moving the mold to bring the flexible blade into contact with the flat surface face and across the flat surface face.

* * * * *